United States Patent
Kamigama et al.

(10) Patent No.: US 8,018,688 B2
(45) Date of Patent: Sep. 13, 2011

(54) HEAD STACK ASSEMBLY WITH SPACERS TO PARTITION DRIVE ARMS

(75) Inventors: Takehiro Kamigama, Hong Kong (CN); Yiu Sing Ho, Hong Kong (CN); Canhua Chen, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 865 days.

(21) Appl. No.: 11/948,709

(22) Filed: Nov. 30, 2007

(65) Prior Publication Data

US 2008/0068757 A1 Mar. 20, 2008

Related U.S. Application Data

(62) Division of application No. 10/832,444, filed on Apr. 27, 2004, now Pat. No. 7,322,094.

(51) Int. Cl.
*G11B 5/55* (2006.01)
*G11B 21/08* (2006.01)
(52) U.S. Cl. .......... 360/266; 360/266.1; 360/265.7; 360/264.2; 360/264.7

(58) Field of Classification Search .......... 360/264.2, 360/264.7, 265.7, 265.8, 265.9, 266, 266.1, 360/26
See application file for complete search history.

(56) References Cited

U.S. PATENT DOCUMENTS

| | | | |
|---|---|---|---|
| 5,758,406 A | 6/1998 | Hunsaker et al. | |
| 5,953,183 A * | 9/1999 | Butler et al. | 360/264.2 |
| 6,166,888 A | 12/2000 | Tsuda et al. | |
| 6,229,677 B1 | 5/2001 | Hudson et al. | |
| 6,836,387 B2 * | 12/2004 | Ohba et al. | 360/97.01 |
| 7,092,216 B1 * | 8/2006 | Chang et al. | 360/265.9 |
| 7,161,769 B1 * | 1/2007 | Chang et al. | 360/265.9 |
| 2003/0030941 A1 * | 2/2003 | Lau et al. | 360/266 |
| 2003/0086213 A1 * | 5/2003 | Shin et al. | 360/266.3 |
| 2003/0189796 A1 * | 10/2003 | Hayakawa et al. | 360/264.2 |

* cited by examiner

*Primary Examiner* — Jefferson Evans
(74) *Attorney, Agent, or Firm* — Brinks Hofer Gilson & Lione

(57) ABSTRACT

A head stack assembly of a disk drive unit includes a head arm assembly (HAA) having a head gimbal assembly, a drive arm to be connected with the head gimbal assembly; wherein the drive arm comprises a securing portion, a connection portion and a spacer connecting the securing portion with the connection portion. At least one undercut is formed on the spacer of the drive arm to strengthen the drive arm.

13 Claims, 12 Drawing Sheets

HEAD STACK ASSEMBLY WITH SPACERS TO PARTITION DRIVE ARMS

CROSS-REFERENCE TO RELATED APPLICATIONS

This is a division of application Ser. No. 10/832,444 filed Apr. 27, 2004.

FIELD OF THE INVENTION

The present invention relates to disk drive units, and more particularly to a HSA (head stack assembly).

BACKGROUND OF THE INVENTION

Disk drives are information storage devices that use magnetic media to store data. Referring to FIG. 1, a typical disk drive in prior art comprises a drive arm 5, a head gimbal assembly (HGA) 4 with a slider 3 being coupled to the drive arm 5 (the drive arm and the HGA with the slider also known as head stack assembly (HSA)), a magnetic disk 1 mounted on a spindle motor 2 which causes the magnetic disk 1 to spin, and a disk drive base plate 13 to enclose the above-mentioned components. The slider 3 flies over the surface of the magnetic disk 1 at a high velocity and is positioned radially by a voice coil 7 embedded (e.g. by epoxy potting or overmolding) in a fantail spacer 8 to read data from or write data to concentric data tracks on the magnetic disk 1. Generally, a voice coil motor (VCM) 10 is used to drive the voice coil 7.

Referring to FIGS. 2(a) and 3, a traditional head stack assembly (HSA) comprises an independent fantail spacer 8 which is interposed between two pieces of the drive arms 5 and combines with the drive arms 5 together with a securing means. The securing means is consisted of a pivot member 6, a washer 25' and a nut 26'. In the prior art, the HGA 4 is coupled to the drive arm 5 by laser welding or swaging the suspension of the HGA 4 with the drive arm 5. The drive arms 5 each have a suspension flexure cable 20 running from the sliders 3 to a plurality of bonding pads 19. The suspension flexure cable 20 is secured to the suspension of the HGA 4 by laser welding or adhesive.

In typical disk drives, referring to FIGS. 2(a) and 2(b), electrical control signals are communicated to the voice coil 7 by a flexible printed circuit assembly (FPCA) 9. The bonding pads 19 of the suspension flexure cable 20 are electrically connected with the FPCA 9 by using connection balls 15 (e.g., by soldering or ultrasonic bonding) to bond the bonding pads 19 to a plurality of connecting pads 16 of the FPCA 9. Thus, the FPCA 9 may communicate read/write data to the slider(s) 3. In addition, referring to FIG. 1, a printed circuit board (PCB) 11 mounted on a bracket 12 is provided to control the position of the drive arm(s) 5 with the slider(s) 3.

With reference to FIG. 2(a), the FPCA 9 is aligned with the fantail spacer 8 at an end thereof by an alignment pin 17 protruding from the fantail spacer 8. After positioning, the FPCA 9 will be electrically coupled to the HGA 4.

However, because the traditional HSA use the independent fantail spacer 8 to partition the two pieces of the drive arms 5, and manufacturing the fantail spacer 8 takes much time and money, the cost of the HSA becomes higher and the manufacturing process becomes more complicated.

It is therefore desirable to provide a HSA of a disk drive unit to solve the above-mentioned problems.

SUMMARY OF THE INVENTION

A main feature of the present invention is to provide a low-cost HSA of a disk drive unit which is easily manufactured.

To achieve the above-mentioned feature, a head stack assembly of a disk drive unit of the present invention comprises a head arm assembly (HAA) having a head gimbal assembly and a drive arm to be connected with the head gimbal assembly, and an additional head arm assembly having a second head gimbal assembly, a second drive arm to be connected with the second head gimbal assembly, and a voice coil embedded in the second drive arm. The drive arm comprises a securing portion, a connection portion and a spacer connecting the securing portion with the connection portion. The additional HAA is coupled with the HAA by a securing means.

In the present invention, the additional HAA further comprises a flexible printed circuit assembly (FPCA) having a U-shaped connector attached to one end of the FPC, and a connection leg extending from one side of the FPC. The connection leg has two voice coil pads and a grounding pad formed thereon, the second drive arm is provided with a grounding pin and two connection pins which are electrically coupled with the grounding pad and the two voice coil pads, respectively.

In the present invention, at least one reinforcing rib is formed on the spacer of the drive arm to strengthen the drive arm. In addition, a bracket is positioned on one side of the second drive arm, which comprises a bracket body having at least one bracket clamp extending from one side thereof and at least one alignment pin formed thereon, and a guiding rail extending from one end of the bracket body, the flexible printed circuit (FPC) having at least one alignment hole corresponding to the at least one alignment pin. The FPCA is aligned with the bracket by the alignment pin and fixed by the bracket clamp.

In addition, each of the two head gimbal assemblies has a suspension flexure cable with a plurality of bonding pads provided thereon, and the U-shaped connector comprises two connection plates each having a plurality of connecting pads thereon to electrically connect with the bonding pads of the two suspension flexure cables.

A head stack assembly of the present invention comprises a head arm assembly having a head gimbal assembly and a drive arm to be connected with the head gimbal assembly. The drive arm comprises a securing portion, a connection portion and a spacer connecting the securing portion with the connection portion. At least one undercut is formed on the spacer of the drive arm to strengthen the drive arm.

The head stack assembly further comprises an additional HAA having a second head gimbal assembly (HGA), a second drive arm to be connected with the second HGA, and a voice coil embedded in the second drive arm. The additional HAA is coupled with the HAA by a securing means. In addition, a bracket is positioned on one side of the second drive arm, which comprises a bracket body having at least one bracket clamp extending from one side thereof and at least one alignment pin formed thereon, and a guiding rail extending from one end of the bracket body.

In the present invention, the additional HAA further comprises a flexible printed circuit assembly (FPCA) having a flexible printed circuit (FPC) having at least one alignment hole corresponding to the at least one alignment pin, a U-shaped connector attached to one end of the FPC, and a connection leg extending from one side of the FPC. The FPCA is aligned with the bracket by the alignment pin and fixed by the bracket clamp. The connection leg has two voice coil pads and a grounding pad formed thereon. The second drive arm is provided with a grounding pin and two connection pins which are electrically coupled with the grounding pad and the two voice coil pads, respectively.

Comparing with the prior art, the head stack assembly of the present invention has the drive arm formed a step thereon as a spacer to partition the two head arm assemblies. Therefore, an independent fantail spacer is saved and accordingly the manufacturing process of the HSA becomes easier and the cost thereof becomes lower. In addition, by forming a step on the drive arm, the securing means does not protrude from the HAA as a traditional HSA. Thus, the HSA of the present invention can be made thinner. Furthermore, the design of the special bracket on the first HAA and the corresponding FPCA makes the electrical and physical connection there between more reliable.

Other objects, advantages and novel features of the invention will become more apparent from the following detailed description of a preferred embodiment thereof when taken in conjunction with the accompanying drawings.

DETAILED DESCRIPTION OF THE INVENTION

Figure 1:
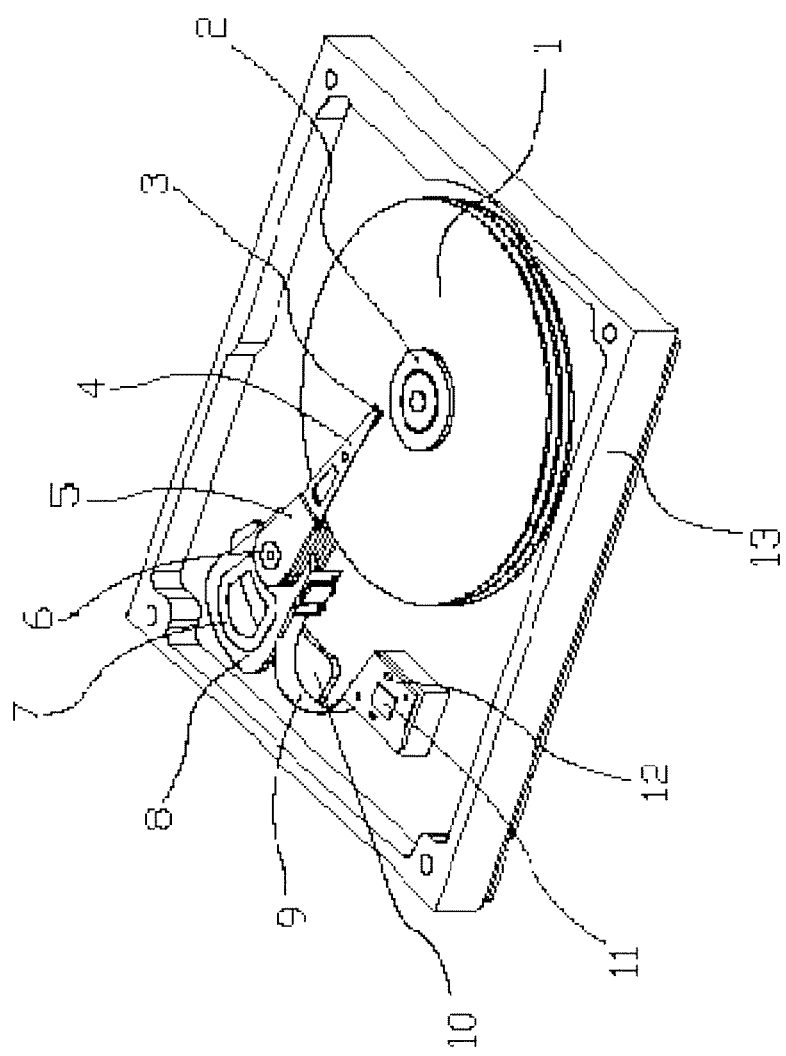
FIG. 1 is a perspective view of a traditional disk drive.
Figure 2A:
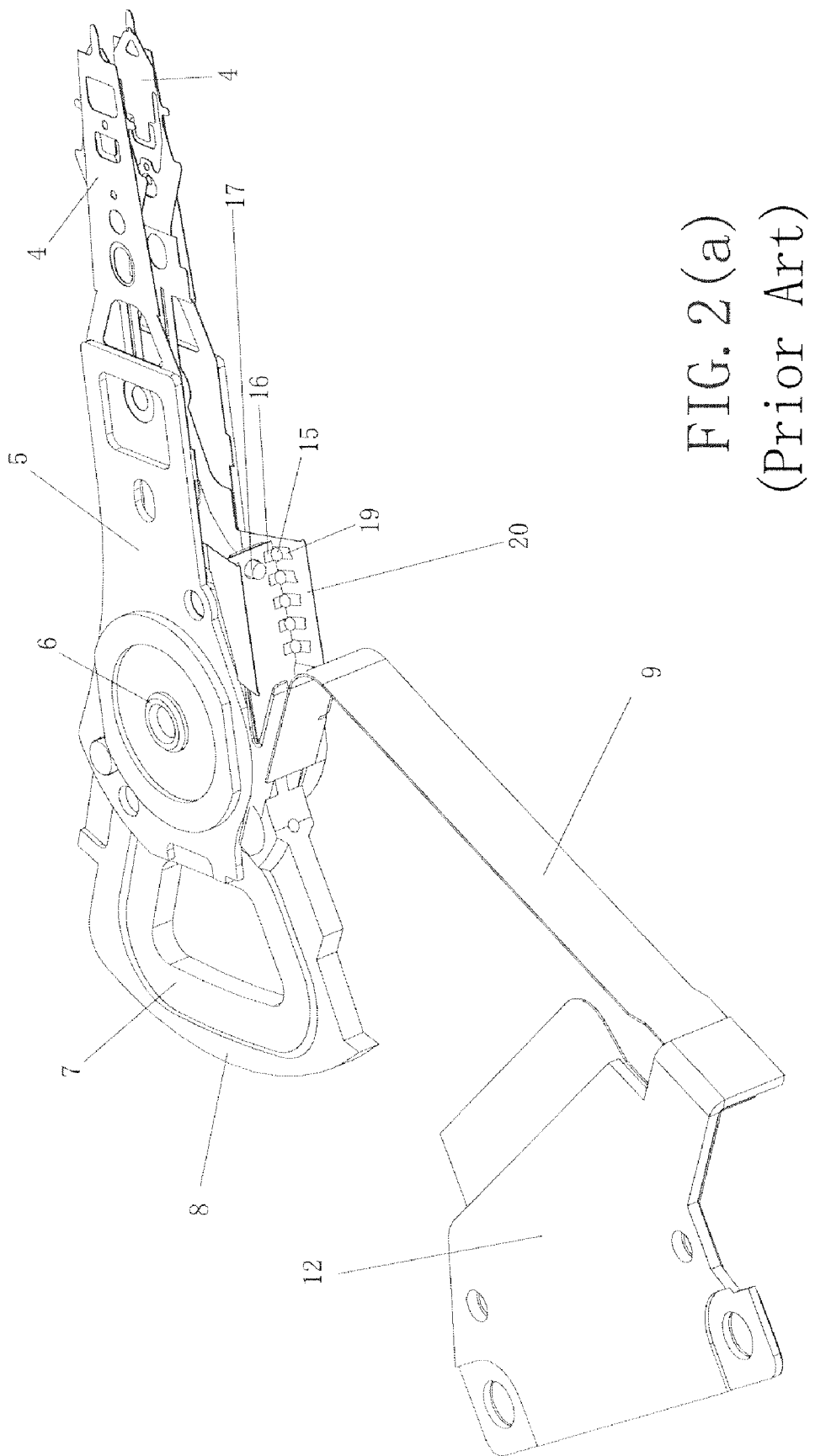
FIG. 2(a) is a perspective view of a traditional head stack assembly (HSA)
Figure 2:
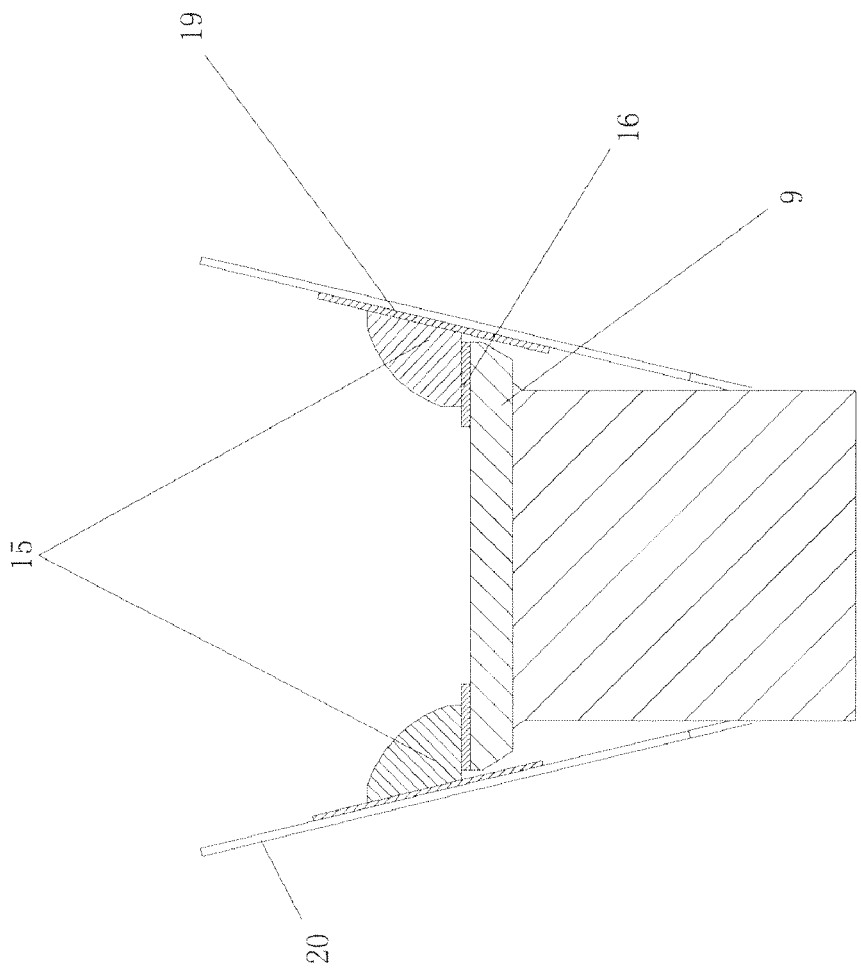
FIG. 2(b) is an enlarged, cross-sectional view of an electrical connection between suspension flexure cables and FPCA of the HSA of FIG. 2(a)
Figure 3:
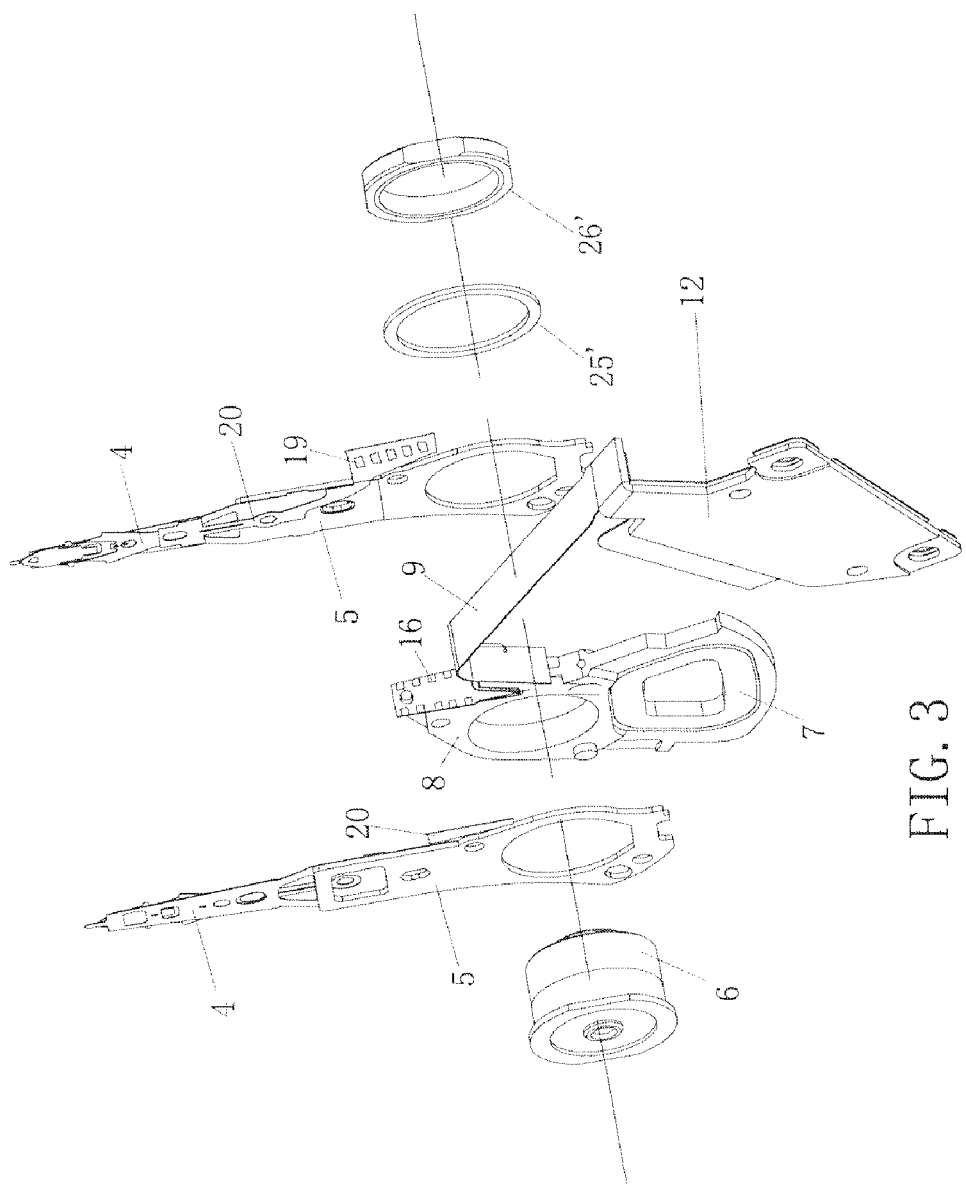
FIG. 3 is an exploded, perspective view of the HSA in FIG. 2(a)
Figure 4:
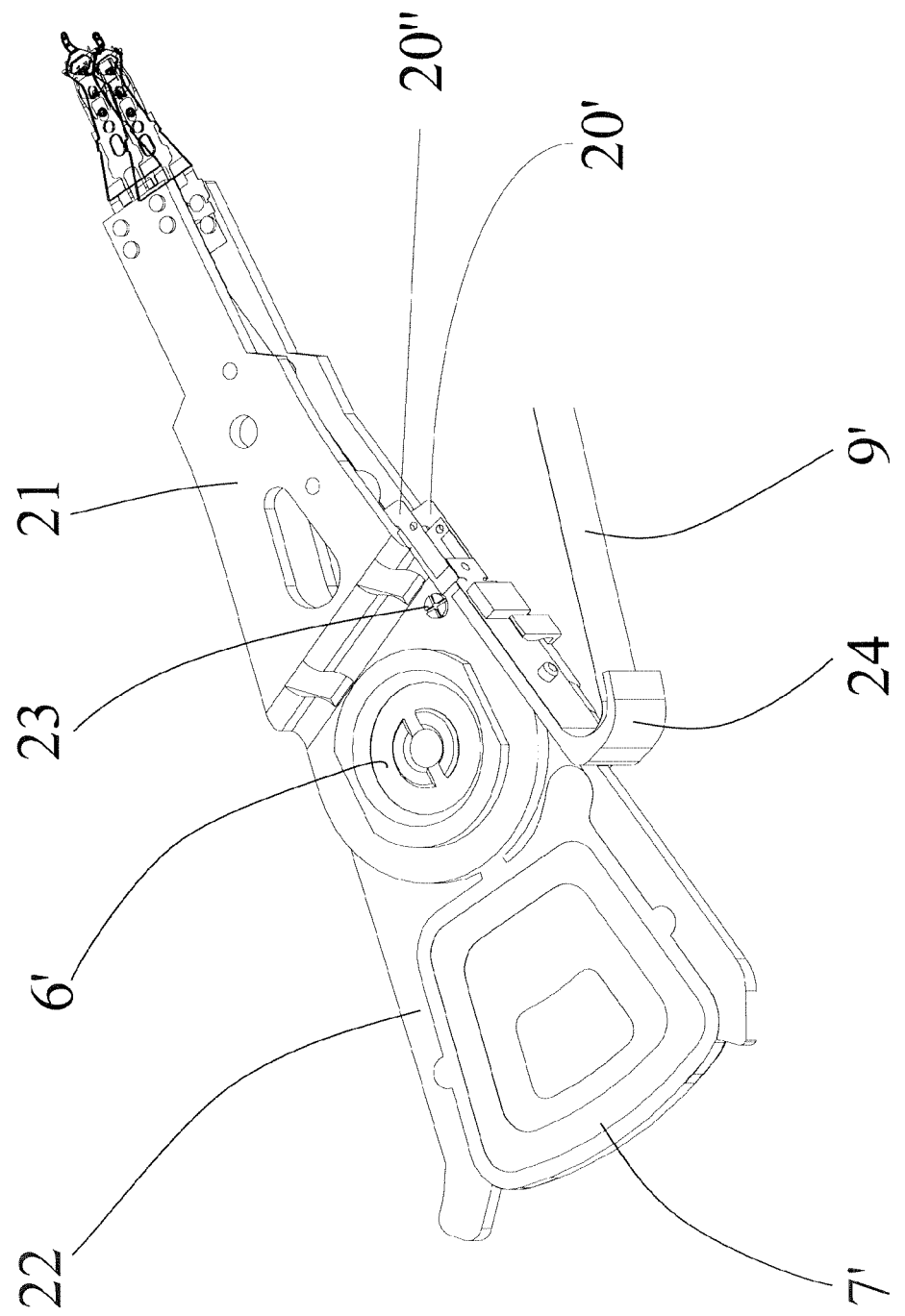
FIG. 4 is a perspective view of a HSA according to the present invention.

Referring now to the drawings in detail, FIG. 4 shows an HSA of a disk drive unit according to an embodiment of the present invention. The HSA comprises a first head arm assembly (HAA) 21 and a second head arm assembly (HAA) 22 coupled to the first HAA 21 by securing means (not labeled). In an embodiment of the present invention, see FIG. 5, the securing means comprises a pivot 6', a washer 25, a nut 26 and a screw 23.

Figure 8:
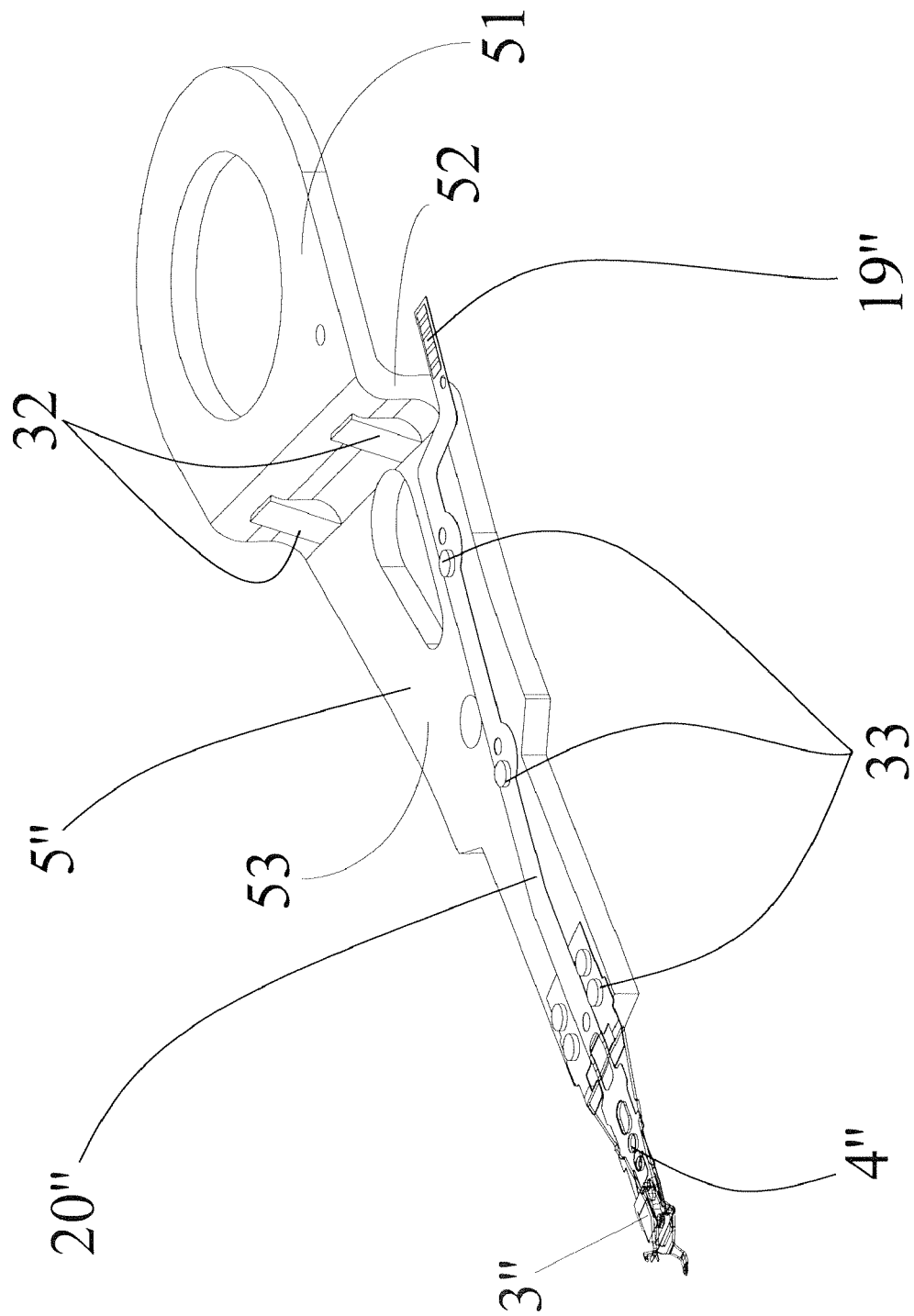
FIG. 8 is a perspective view of a first HAA of the HSA showing in FIG. 5.

With reference to FIG. 8, the first HAA 21 comprises a first head gimbal assembly (HGA) having a first suspension 4" and a first slider 3", and a first drive arm 5" to be connected with the first suspension 4". The first suspension 4" is provided a first suspension flexure cable 20" coupled thereon. In an embodiment of the present invention, the first suspension 4" is overmolded onto the first drive arm 5" and the first suspension flexure cable 20" are coupled with the first suspension 4" by overmold as well. The first drive arm 5" is stamped to form a step constructed by a securing portion 51, a connection portion 53 and a spacer 52 connecting the securing portion 51 with the connection portion 53. Two reinforcing ribs 32 are made on the spacer 52 to strengthen the first drive arm 5". In the present invention, because a step is formed on the first drive arm 5", so the pivot 6' does not protrude from the first HAA 21 as a traditional HSA. Thus, the HSA of the present invention can be made thinner because the height of the pivot 6' contributes to the total height of the HSA. Additionally, the first suspension flexure cable 20" is also provided with a plurality of bonding pads 19" on an end thereof Referring to FIG. 6, the second HAA 22 comprises a second head gimbal assembly having a second suspension 4' and a second slider 3'(see FIG. 9), a second drive arm 5' to be connected with to the second suspension 4', a bracket 24 positioned on one side of the second drive arm 5', and a voice coil 7' embedded in the second drive arm 5' for controlling the motion of the second drive arm 5'. In an embodiment of the invention, the bracket 24, the second suspension 4', and the voice coil 7' are overmolded onto the second drive arm 5'.

Figure 5:
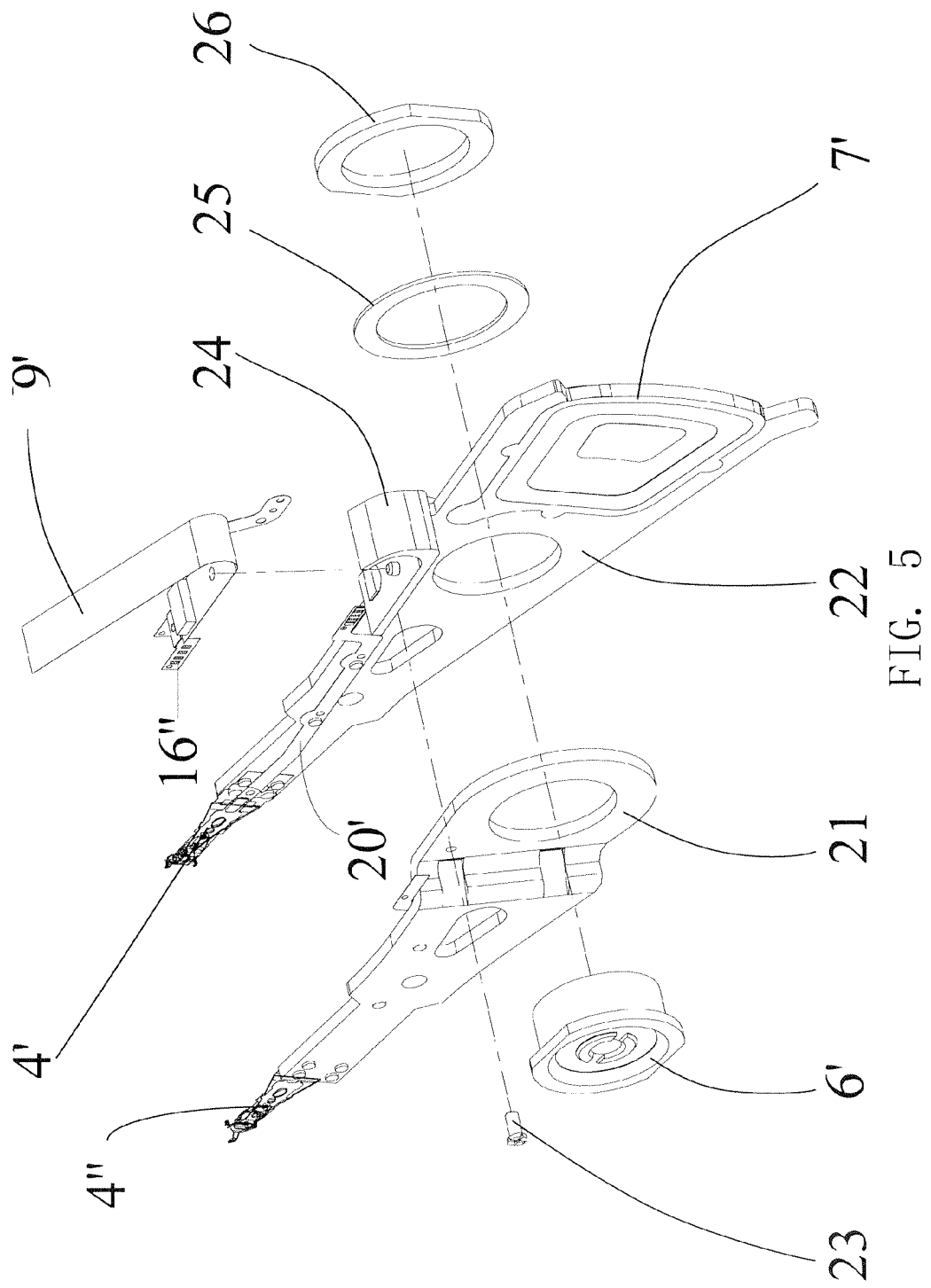
FIG. 5 is an exploded, perspective view of the HSA of FIG. 4.
Figure 6:
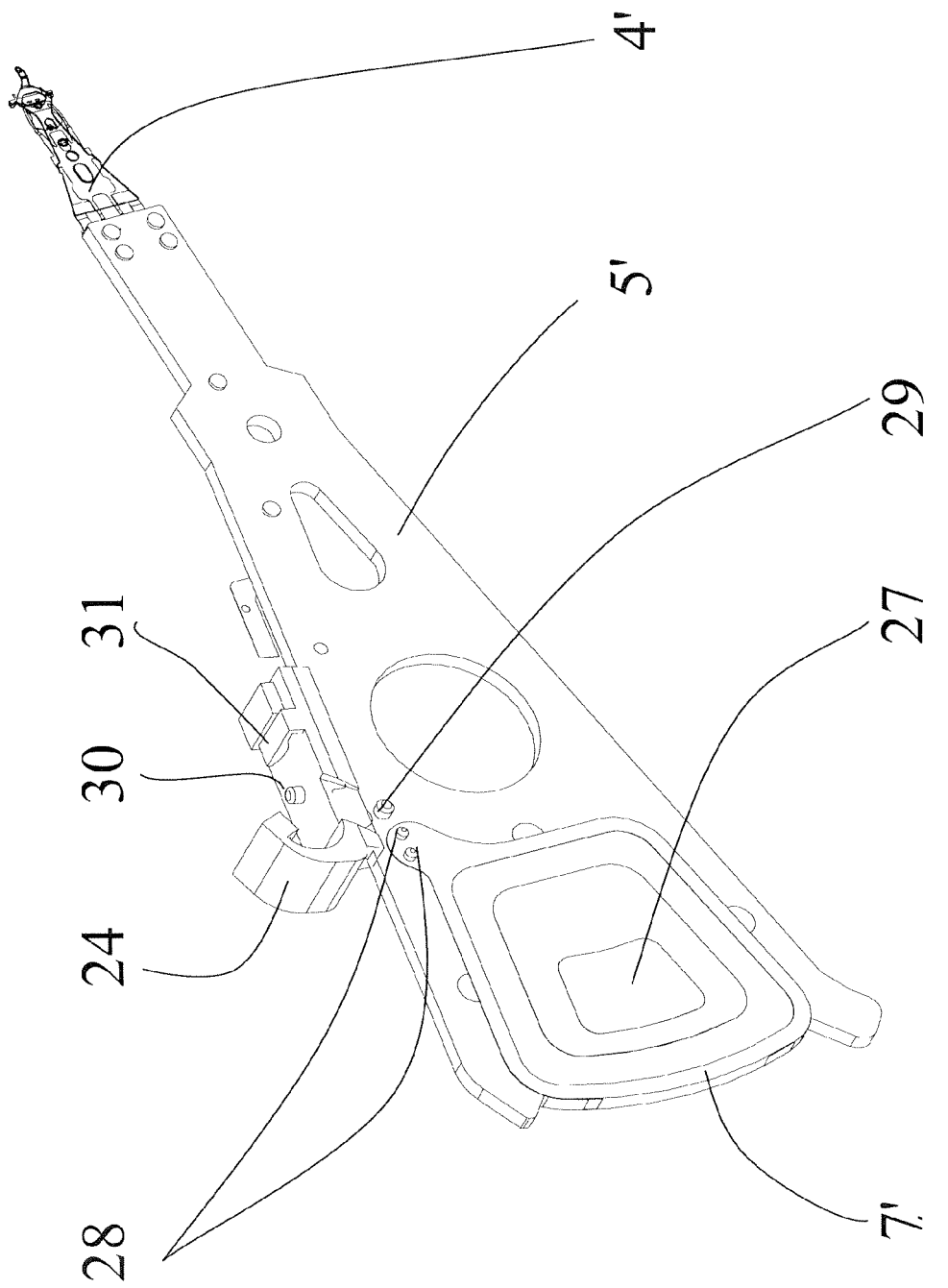
FIG. 6 is a perspective view of a second HAA of the HSA in FIG. 5.
Figure 9:
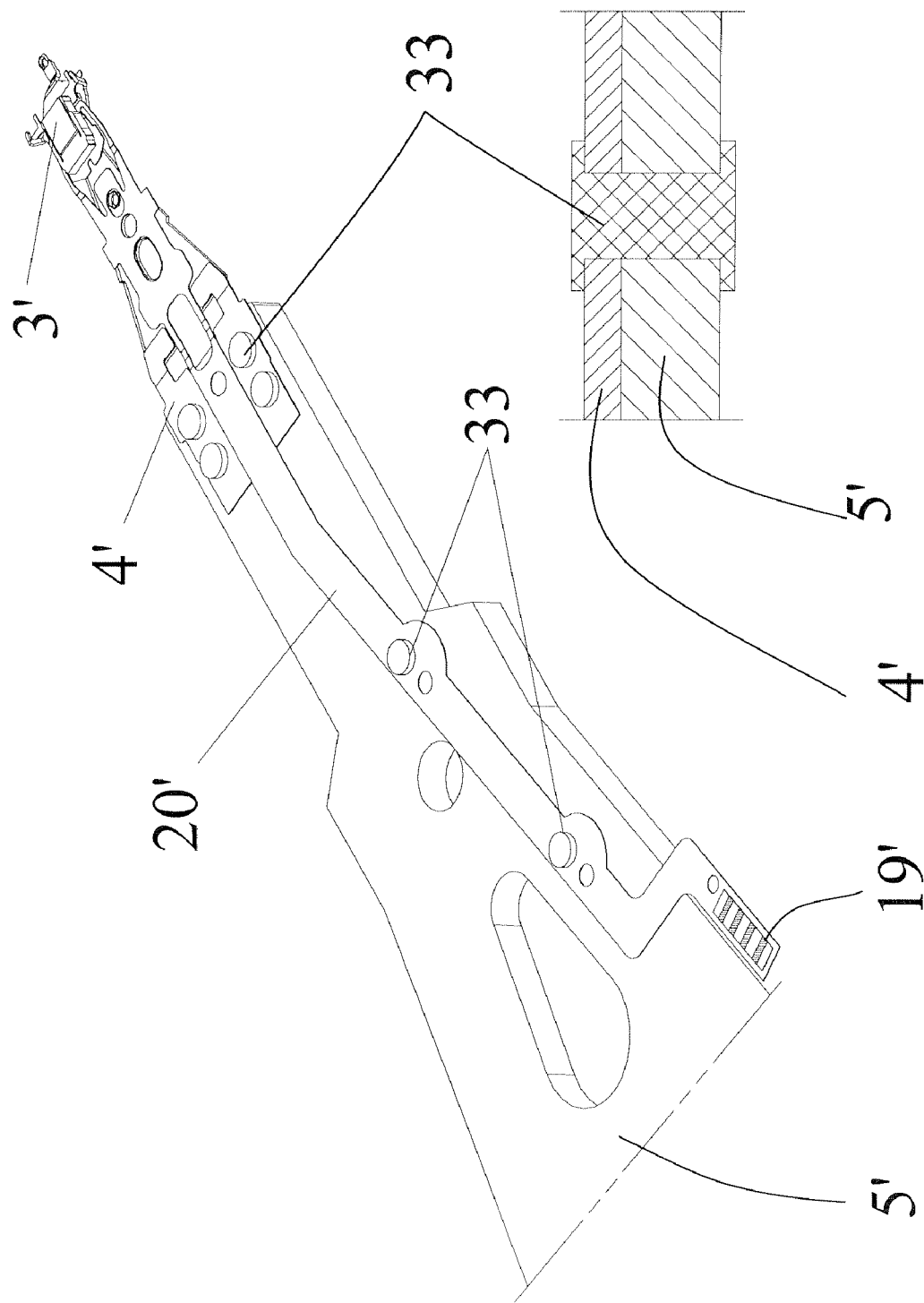
FIG. 9 is a partial, enlarged perspective view of the second HAA in FIG. 6.
Figure 10:
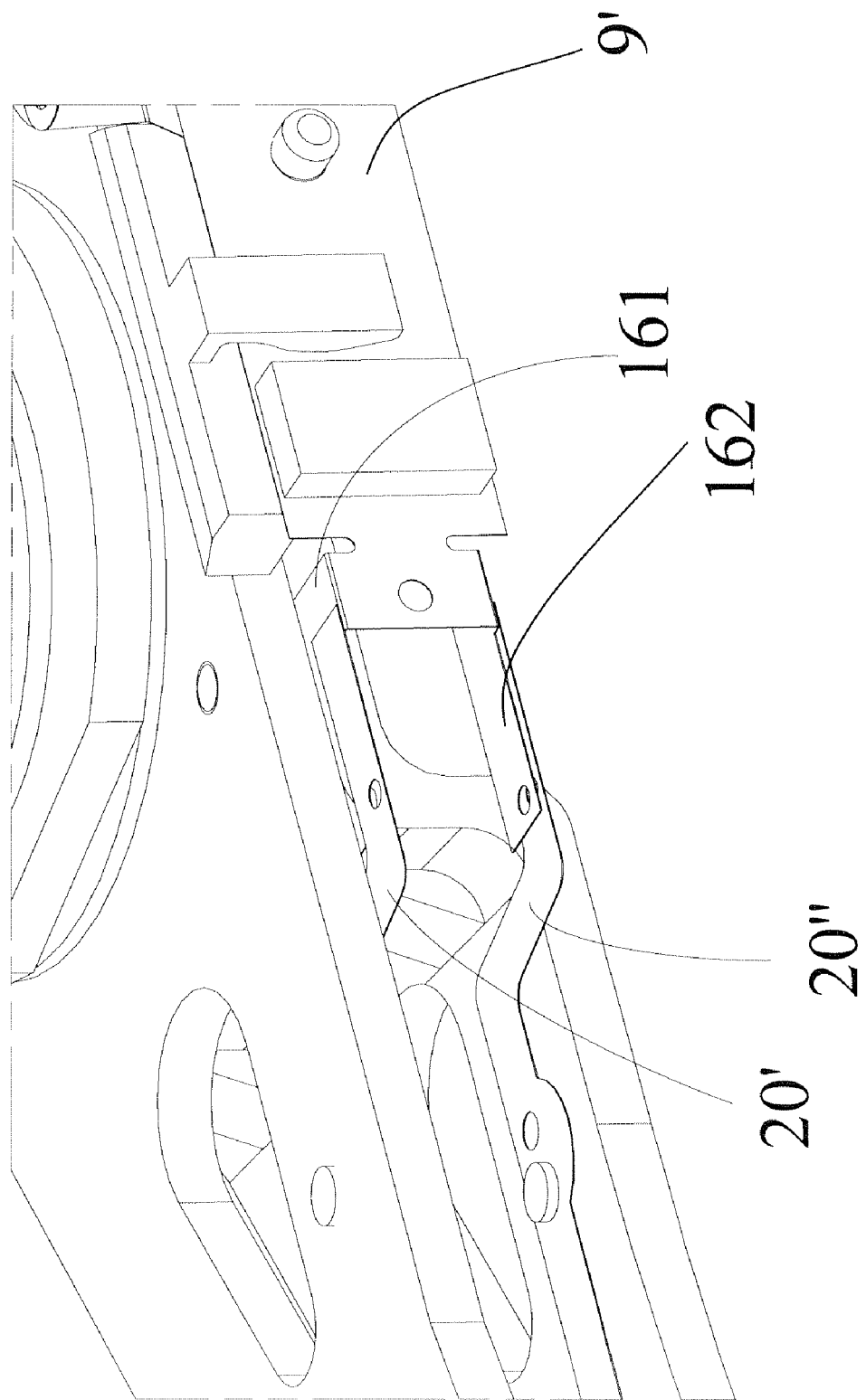
FIG. 10 is a partial, enlarged perspective view of the HSA in FIG. 4 showing an electrical connection between the suspension flexure cables and the FPCA.

In the present invention, with reference to FIGS. 5, 6 and 9, the second suspension 4' has a second suspension flexure cable 20' coupled thereon by overmold which runs from the second slider 3' toward the bracket 24. To make the invention easily understood, a detailed view of overmold status of the second HAA 22 is shown in FIG. 9. There are at least two overmold pins 33 used for the attachment of the second suspension 4', and at least two overmold pins 33 used for the attachment of the second suspension flexure cable 20'. In the present invention, an overmold status of the first HAA 21 is similar to that of the second HAA 22 and a detail view thereof is omitted herefrom. A plurality of bonding pads 19' is provided on an end of the second suspension flexure cable 20'. The second drive arm 5' is provided with a grounding pin 29 and two embedded connection pins 28 near the bracket 24. The voice coil 7' is driven by a VCM (not shown), which is provided two voice coil leads (not shown) soldered with the connection pins 28. Also, a balance plate 27 is mounted in the voice coil 7' to balance the motion of the second drive arm 5'. The connection pins 28, the voice coil 7' and the balance plate 27 are overmolded onto the drive arm 5' together.

Figure 7:
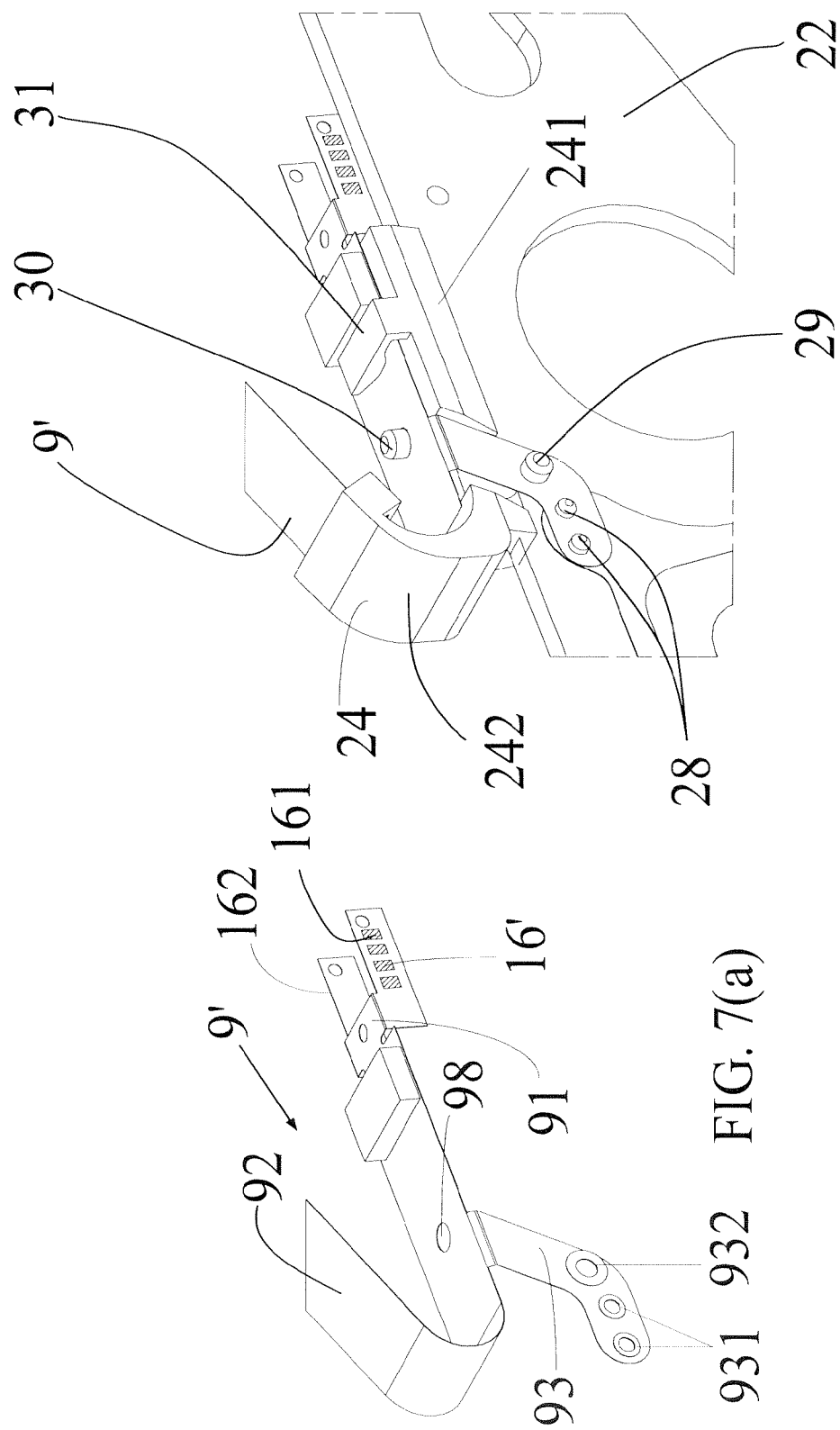
FIG. 7(a) is an enlarged, perspective view of a FPCA of the HSA in FIG. 5.
FIG. 7(b) is an enlarged, perspective view of the FPCA with a bracket of the second HAA in FIG. 6.

Referring to FIG. 7(b), the bracket 24 comprises a bracket body 241 and a guiding rail 242 extending from one end of the bracket body 241. The bracket body 241 has a bracket clamp 31 extending from one side thereof and an alignment pin 30 formed thereon. A FPCA 9' is aligned with the bracket 24 by the alignment pin 30 and fixed by the bracket clamp 31. Referring to FIG. 7(a), the FPCA 9' comprises a flexible printed circuit (FPC) 92, a U-shaped connector 91 formed to one end of the FPC 92, and a connection leg 93 extending from one side of the FPC 92. The FPC 92 has an alignment hole 98 formed therein corresponding to the alignment pin 30 to receive the alignment pin 30. The connection leg 93 has two voice coil pads 931 and a grounding pad 932 formed thereon, the two voice coil pads 931 are provided for the connection pins 28 to extend through, and the grounding pad 932 is provided for the grounding pin 29 to extend through. The U-shaped connector 91 comprises two connection plates 161, 162 with a plurality of connecting pads 16' and 16" (see FIG. 5) thereon, respectively. To satisfy the configuration of the guiding rail 242, the flexible printed circuit (FPC) 92 is folded to contact with the inner surface of the guiding rail 242.

Referring to FIGS. 7(a) and 7(b), in the present invention, the voice coil pads 931 and the grounding pad 932 of the FPCA 9' are electrically coupled with the connection pins 28 and the grounding pin 29 by soldering. At the same time, the voice coil leads (not shown) are electrically connected with the voice coil pads because the voice coil leads (not shown) are soldered with the connection pins 28.

Figure 11:
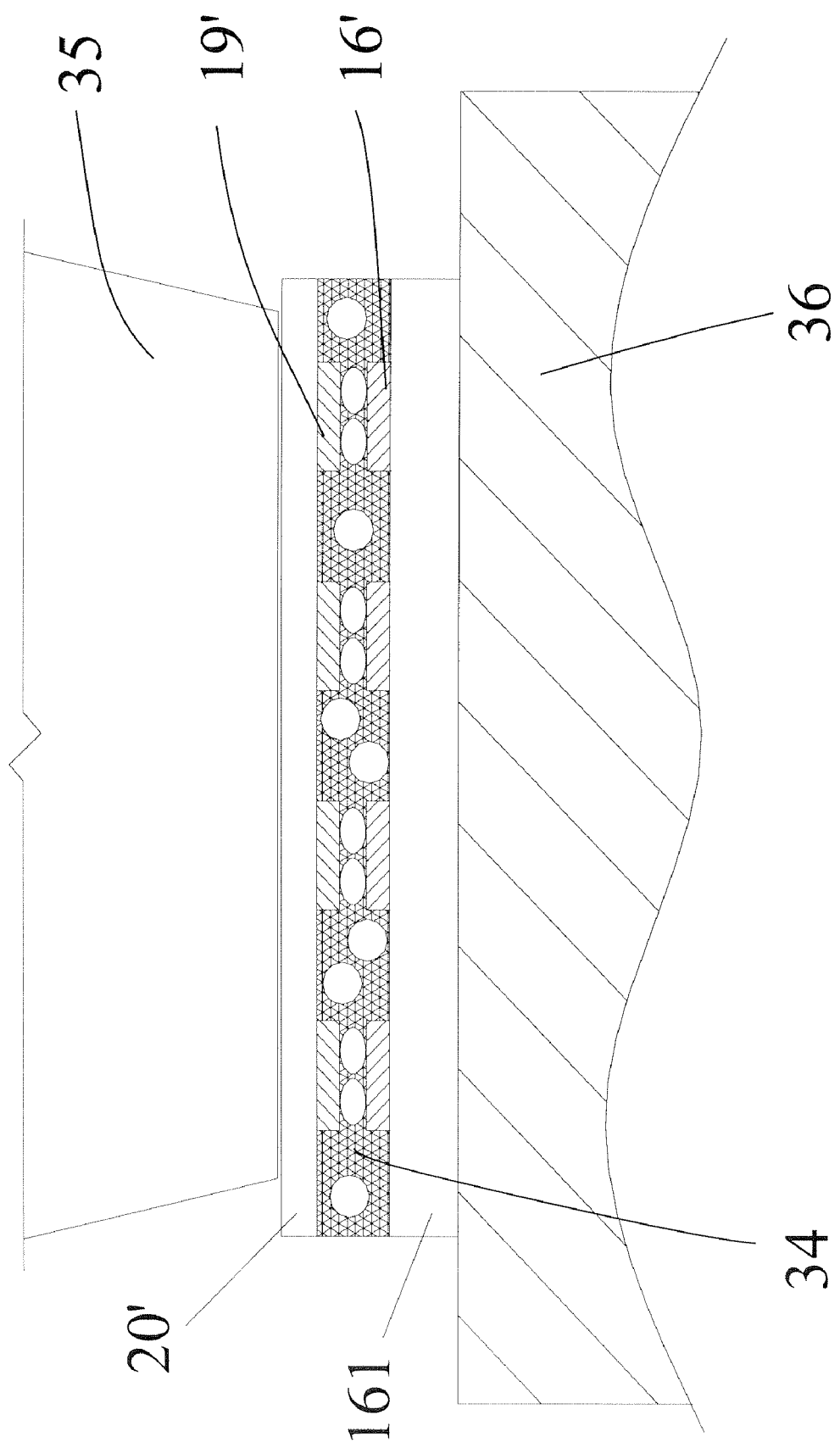
FIG. 11 is a schematic view showing a process of electrical connection between the suspension flexure cable and the FPCA.

In the present invention, the bonding pads 19', 19" of the first and second suspension flexure cable 20' and 20" are electrically coupled with the connecting pads 16', 16" of the FPCA 9' by epoxy. Referring to FIG. 11, in an embodiment, the epoxy is a tacky electrical conductive film 34, such as Anisotropic Conductive Film (ACF), which adheres to and cover the bonding pad 19' of the second suspension flexure cable 20'. Then, the conductive film 34 is pressed against the connecting pad 16' of the FPCA 9' by a bonding tip 35 to bond the bonding pad 19' with the connecting pad 16' together. The bonding tip 35 is heated and then compresses the conductive film 34 to start the curing process. In an embodiment, an additional support plate 36 is inserted into the U-shaped connector 91 for support. Similarly, the bonding pads 19" of the first suspension flexure cable 20" are electrically coupled with the connecting pads 16" of the FPCA 9' and a detailed description thereof is omitted herefrom.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A head stack assembly of a disk drive unit which comprises:
   a head arm assembly having a head gimbal assembly and a drive arm to be connected with the head gimbal assembly; wherein the drive arm comprises a securing portion, a connection portion and a spacer connecting the securing portion with the connection portion; and
   an additional head arm assembly having a second head gimbal assembly, a second drive arm to be connected with the second head gimbal assembly, and a voice coil embedded in the second drive arm;
   wherein the additional head arm assembly further comprises a flexible printed circuit assembly having a flexible printed circuit having a connector attached to one end of the flexible printed circuit and a connection leg extending from one side of the flexible printed circuit;
   wherein the connection leg has two voice coil pads and a grounding pad formed thereon, the second drive arm is provided with a grounding pin and two connection pins which are electrically coupled with the grounding pad and the two voice coil pads, respectively.

2. The head stack assembly according to claim 1, wherein at least one reinforcing rib is formed on the spacer of the drive arm and the at least one reinforcing rib spans the spacer to connect the securing portion with the connection portion to strengthen the drive arm.

3. The head stack assembly according to claim 2, wherein one end of the reinforcing rib is connecting to the connection portion, and the other end of the reinforcing rib is connecting to the securing portion without any connection to the other portions of the spacer.

4. The head stack assembly according to claim 1, wherein a bracket is positioned on one side of the second drive arm, the bracket comprising a bracket body having at least one bracket clamp extending from one side thereof and at least one alignment pin formed thereon, and a guiding rail extending from one end of the bracket body, the flexible printed circuit has at least one alignment hole corresponding to the at least one alignment pin.

5. The head stack assembly according to claim 4, wherein the flexible printed circuit assembly is aligned with the bracket by the alignment pin and fixed by the bracket clamp.

6. The head stack assembly according to claim 4, wherein each of the two head gimbal assemblies has a suspension flexure cable with a plurality of bonding pads coupled thereon, and the connector comprises two connection plates each having a plurality of connecting pads thereon to electrically connect with the bonding pads of the two suspension flexure cables.

7. A head stack assembly of a disk drive unit which comprises:
   a head arm assembly having a head gimbal assembly and a drive arm to be connected with the head gimbal assembly;
   wherein the drive arm comprises a securing portion, a connection portion and a spacer connecting the securing portion with the connection portion;
   wherein at least one reinforcing rib is formed on the spacer of the drive arm and the at least one reinforcing rib spans the spacer to connect the securing portion with the connection portion to strengthen the drive arm;
   wherein one end of the reinforcing rib is connecting to the connection portion, and the other end of the reinforcing rib is connecting to the securing portion without any connection to the other portions of the spacer.

8. The head stack assembly according to claim 7, wherein the head stack assembly further comprises an additional head arm assembly having a second head gimbal assembly, a second drive arm to be connected with the second head gimbal assembly, and the second drive arm having a coil portion to be embedded with a voice coil, and the head arm assembly is coupled to the additional head arm assembly by connecting the securing portion of the drive arm to the second drive arm.

9. The head stack assembly according to claim 8, wherein a bracket is positioned on one side of the second drive arm, the bracket comprising a bracket body having at least one bracket clamp extending from one side thereof and at least one alignment pin formed thereon, and a guiding rail extending from one end of the bracket body.

10. The head stack assembly according to claim 9, wherein the additional head arm assembly further comprises a flexible printed circuit assembly having a flexible printed circuit having at least one alignment hole corresponding to the at least one alignment pin, a connector attached to one end of the flexible printed circuit, and a connection leg extending from one side of the flexible printed circuit.

11. The head stack assembly according to claim 10, wherein the head stack assembly according to claim 5, wherein the flexible printed circuit assembly is aligned with the bracket by the alignment pin and fixed by the bracket clamp.

12. The head stack assembly according to claim 10, wherein the connection leg has two voice coil pads and a grounding pad formed thereon, the second drive arm is provided with a grounding pin and two connection pins near the bracket which are electrically coupled with the connection pins and the grounding pin, respectively.

13. The head stack assembly according to claim 10, wherein each of the two head gimbal assemblies has a suspension flexure cable with a plurality of bonding pads coupled thereon, and the connector comprises two connection plates each having a plurality of connecting pads thereon to electrically connect with the bonding pads of the two suspension flexure cables.

* * * * *